May 27, 1952  J. R. HOLLINS  2,598,056
VEHICLE LIGHT INDICATOR
Filed Dec. 24, 1948
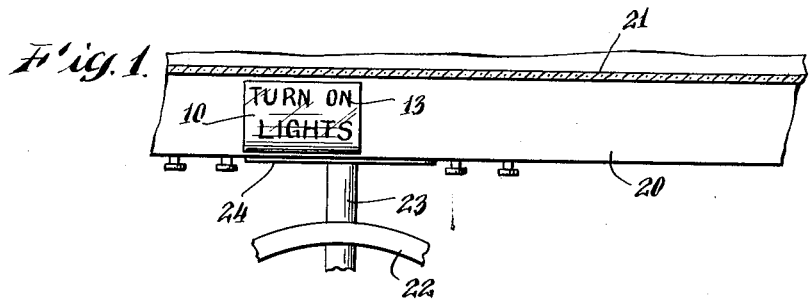
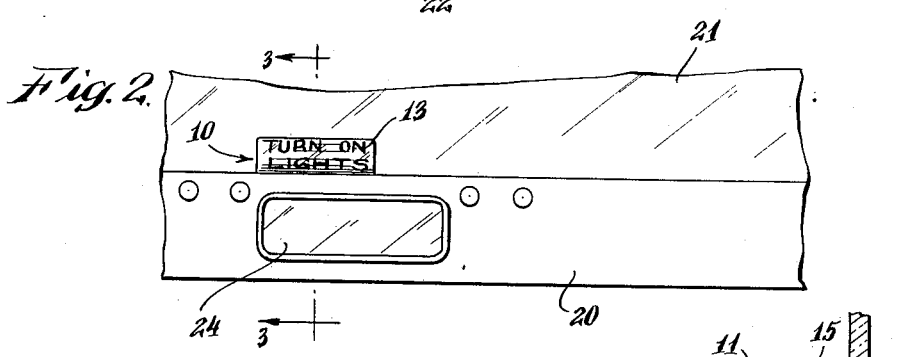
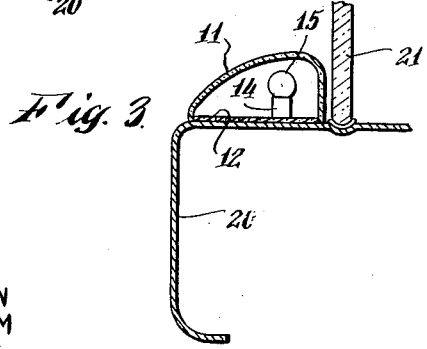
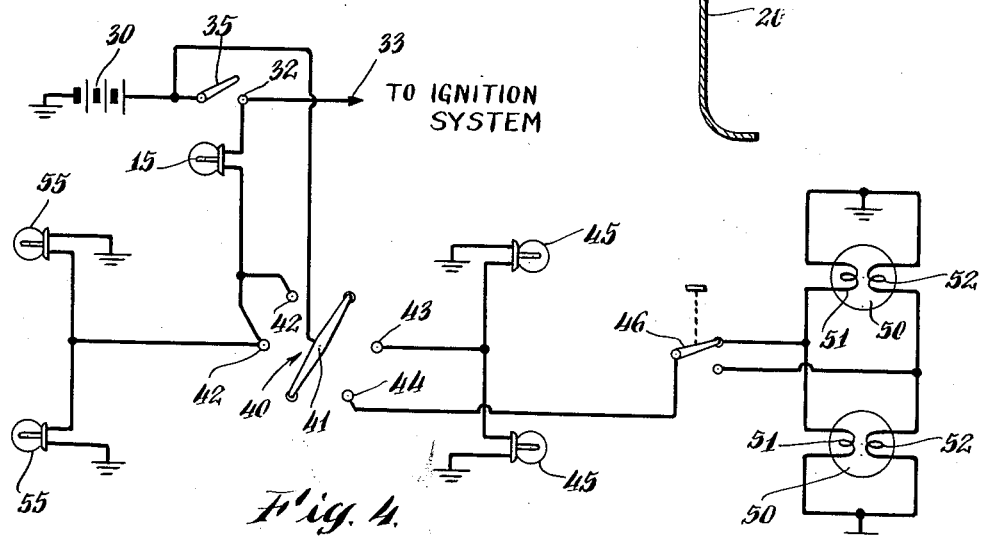
INVENTOR.
Jesse R. Hollins
BY
ATTORNEY.

Patented May 27, 1952

2,598,056

UNITED STATES PATENT OFFICE 2,598,056

VEHICLE LIGHT INDICATOR

Jesse R. Hollins, Brooklyn, N. Y.

Application December 24, 1948, Serial No. 67,150

2 Claims. (Cl. 177—311)

This invention relates to vehicle lighting or lamp circuits and, more particularly, to novel, foolproof means for advising an operator of whether or not the vehicle lamps are illuminated whenever it is dark enough to require use of driving or indicator lamps.

It is a matter of common observation that many motor vehicle operators fail to turn on the vehicle lamps after dark, particularly when driving in illuminated areas such as within cities, business districts of villages, and other places having a reasonably high level of street illumination. It is also known, from accident records and observation, that drivers fail to turn on the car lamps early enough at dusk and tend to extinguish them too early when driving at dawn. As a matter of fact, many serious accidents occur at dusk and dawn due to failure of a vehicle to have its marker or driving lights illuminated. To date, no foolproof means have been devised to warn an operator of the necessity for turning on the vehicle lamps.

The present invention fills this need by providing an indicator which is illuminated whenever the vehicle ignition switch is closed with the lamp control switch being open. The indicator is automatically deenergized, whenever the lamp control switch is closed to complete any marker or driving lamp circuit. In addition, the level of illumination is such that the lettering of the indicator is not visible during normal daylight, but becomes increasingly visible as the natural light diminishes. Consequently, the driver is warned to turn on the vehicle lamps upon the approach of nightfall, and is warned if the lamps are extinguished too early in the dawn. To achieve maximum effectiveness, the indicator preferably is mounted on the vehicle dash adjacent the windshield to be affected by natural light, and is further located so as to easily catch the driver's eye.

More specifically, the indicator includes a semi-translucent cover or casing having warning lettering embossed or printed thereon, or carried on a strip within the casing. A low candle power lamp is mounted within the casing and connected in series between the open terminal of the vehicle ignition switch and the tail light contact or contacts of the lamp control switch. When the ignition switch is closed, current flows through the indicator lamp and the tail lamp in series. As the indicator lamp is low candle power, it lights, but the current is insufficient to light the high candle power tail lamps. When the lamp control switch is closed, the tail lamps are directly energized at a high current level over a low resistance circuit through the control switch. This circuit shunts the higher resistance indicator lamp circuit, and the indicator lamp is extinguished. While the latter is always illuminated whenever the ignition switch is closed with the lamp control switch open, the level of illumination is such that the lettering on the semi-translucent casing is not visible during normal daylight, but becomes visible as soon as the level of natural illumination falls below a preselected value.

It is, accordingly, an object of this invention to provide foolproof indicator means for advising a vehicle operator whenever it is necessary for the vehicle indicator or driving lights to be illuminated.

Another object is to provide such an indicator having a lamp which is normally illuminated whenever the vehicle ignition switch is closed but which is extinguished automatically whenever the vehicle indicator or driving lamps are illuminated.

A further object is to provide such an indicator whose level of illumination is such that its indications are invisible during daylight driving but become increasingly visible with decreasing natural light levels.

These, and other objects, advantages and novel features of the invention will be apparent from the following description and the accompanying drawing. In the drawing:

Fig. 1 is a partial plan view of a vehicle dash, showing the invention indicator mounted thereon;

Fig. 2 is a partial elevation view of the vehicle dash and indicator;

Fig. 3 is a sectional view on the line 3—3 of Fig. 2; and

Fig. 4 is a schematic wiring diagram of a vehicle lighting circuit incorporating the invention indicator.

Referring to Figs. 1, 2 and 3, the indicator 10 of the invention is illustrated as mounted on a vehicle dash 20 adjacent windshield 21 and located to one side of the steering wheel 22 on column 23. Preferably, indicator 10 is mounted near the instrument panel 24 so as to easily catch the eye of the driver.

Referring to Fig. 3, the indicator 10 includes a hollowed out or otherwise formed semi-translucent cover or casing 11 which may be mounted on or be substantially integral with a base 12 which may be bolted or screwed to dash 20. Casing 11 may be formed of semi-translucent plastic composition material, etched glass, or any other suitable semi-translucent material. The casing carries warning lettering 13, such as "Turn On Lights," which may be printed or etched on the inner surface of the casing or carried on a strip on such inner surface. Within casing 11 is a lamp 15 mounted in a socket 14 on base 12, and lamp 15 is energized whenever the vehicle ignition switch is closed with the lamp control switch open. However, due to the semi-translucency of casing 11, lettering 13 is not visible, though lamp 15 is illuminated, during normal daylight. This effect is enhanced by the low candle power of lamp 15.

The operation of the indicator will be understood from Fig. 4, which shows the usual vehicle battery 30 having one terminal grounded and the other terminal connected to ignition switch 35 and to the center contact 41 of lamp control switch 40. The normally open contact 32 of ignition switch 35 is connected to the ignition circuit, as indicated at 33, and also to one terminal of lamp 15. The other terminal of lamp 15 is connected to the tail lamp contacts 42, 42 of lamp control switch 40.

Switch 40 is a three-position switch which is movable from an open position to engage either the parking lamp control 43 or the head lamp contact 44 to energize either parking lamps 45, 45 or head lamps 50, 50. In either position, tail lamps 55, 55 are energized through contacts 42, 42. The head lamp circuit includes the usual selector switch 46 for selectively energizing either the upper beam filaments 51, 51 or the lower beam filaments 52, 52 of lamps 50, 50.

Whenever ignition switch 35 is closed, lamp 15 is energized over the following circuit: battery 30, switch 35, contact 32, lamp 15, contacts 42, 42 and tail lamps 55, 55 to ground. The current flow through this relatively high resistance circuit is sufficient to illuminate low candle power lamps 15 but insufficient to illuminate high candle power tail lamps 55, 55. When control switch 40 is in either of its closed positions, tail lamps 55 are energized over the following circuit: battery 30, contact 41, switch 42, and tail lamps 55, 55 to ground. This low resistance circuit effects illumination of the tail lamps and shunts lamp 15, thereby effecting extinguishment of the latter.

Thus, whenever ignition switch 35 is closed and control switch 40 is open, lamp 15 is energized, and the lamp is shunted out when control switch 40 is operated to light either the parking or driving lamps. Consequently, whenever it is dark, the driver is immediately warned to turn on his lamps, upon closing the ignition switch, and the warning is maintained until the vehicle lamps are illuminated through light control switch 40. During daylight, the level of illumination of lamp 15 is insufficient to make lettering 13 visible through casing 11. Low candle power lamp 15 has a high resistance, and thus its current consumption is negligible even when continuously energized during operation of the vehicle.

From the foregoing, it will be apparent that a simple, foolproof, automatic indicator of the illumination or non-illumination of the vehicle parking or driving lamps is provided at all times during operation of the vehicle.

While a specific embodiment of the invention has been shown and described in detail to illustrate the application of the principles thereof, it should be understood that the invention may be otherwise embodied without departing from such principles.

What is claimed is:

1. In combination with a vehicle lighting circuit including a relatively low resistance, electric marker lamp and a control switch selectively operable to connect said marker lamp directly to a source of electrical energy, a vehicle ignition switch selectively operable for connection with the source of electrical energy, said ignition switch being disposed intermediate the connection of said control switch and said source of electrical energy whereby said control switch is operable independently of the open or closed position of said ignition switch, means for indicating whether or not said lighting circuit is energized when the ignition switch is closed, said means being in the circuit incorporating both the ignition and the selector switch and comprising relatively high resistance electrically energized indicator means mounted between and connected in series circuit relation with said marker lamp and the vehicle ignition switch, whereby, when the ignition switch is closed and the lamp control switch is open said indicator means will be energized over a relatively high resistance circuit including said marker lamp and closure of the control switch will complete a relatively low resistance energization circuit for said marker lamp to shunt out said indicator means.

2. In combination with a vehicle lighting circuit including relatively low resistance, high candle power tail lamps and a control switch having a live contact connected directly to a source of electrical energy and normally open contact means connected directly to said tail lamps, a vehicle ignition switch selectively operable for connection with the source of electrical energy, said ignition switch being disposed intermediate the connection of said control switch and said source of electrical energy whereby said control switch is operable independently of the open or closed position of said ignition switch, means for indicating whether or not said lighting circuit is energized when the ignition switch is closed, said means being in the circuit incorporating both the ignition and the selector switch and comprising, in combination, a semi-translucent casing containing warning indicia, and a relatively high resistance electric indicator lamp within said casing mounted between and connected in series circuit relation with said tail lamps and the vehicle ignition switch, whereby when the ignition switch is closed and the lamp control switch is open said indicator lamp will be energized over a relatively high resistance circuit including said tail lamps to illuminate said casing and indicia, and closure of the control switch will complete a relatively low resistance energization circuit for said tail lamps to shunt out said indicator lamp to extinguish the latter, said indicator lamp providing a degree of illumination for said casing and indicia such that the indicia is not visible when said casing receives natural daylight but becomes increasingly visible as the level of daylight decreases, to appraise the vehicle operator of the necessity of turning on the vehicle marker lamps.

JESSE R. HOLLINS.

REFERENCES CITED

The following references are of record in the file of this patent:

UNITED STATES PATENTS

| Number | Name | Date |
| --- | --- | --- |
| 1,535,263 | Smetzer | Apr. 28, 1925 |
| 1,566,588 | Godley | Dec. 22, 1925 |
| 2,258,747 | Doane | Oct. 14, 1941 |
| 2,402,312 | Burch | June 18, 1946 |
| 2,409,018 | Corey | Oct. 8, 1946 |
| 2,486,599 | Hollins | Nov. 1, 1949 |